(12) United States Patent
Stanley

(10) Patent No.: US 8,510,216 B2
(45) Date of Patent: Aug. 13, 2013

(54) FINANCIAL INSTRUMENT MANAGEMENT SYSTEM

(75) Inventor: Neil A. Stanley, Omaha, NE (US)

(73) Assignee: Stanley IP LLC, Omaha, NE (US)

(*) Notice: Subject to any disclaimer, the term of this patent is extended or adjusted under 35 U.S.C. 154(b) by 0 days.

(21) Appl. No.: 13/486,034

(22) Filed: Jun. 1, 2012

(65) Prior Publication Data

US 2012/0310858 A1 Dec. 6, 2012

Related U.S. Application Data

(60) Provisional application No. 61/492,872, filed on Jun. 3, 2011.

(51) Int. Cl.
*G06Q 40/00* (2012.01)

(52) U.S. Cl.
USPC ............................................. 705/38; 705/35

(58) Field of Classification Search
USPC ..................................................... 705/38, 35
See application file for complete search history.

(56) References Cited

U.S. PATENT DOCUMENTS

2003/0093351 A1* 5/2003 Sarabanchong ................ 705/36
2006/0184450 A1* 8/2006 Ely et al. ........................ 705/38

OTHER PUBLICATIONS

Bogoslaw, David, "Investing: Should You Test-Drive a Hybrid CD"; Business Week; Nov. 16, 2009; Journal Code: BWOL.*
Financial Services Review; "The economics of Savings bonds"; Dec. 2004; Document Type: Journal.*
PR_Newswire; "First of America Introduces Rising Rate Certificates of Deposit"; Oct. 10, 1991; Supplier Number: 11371813.*

* cited by examiner

*Primary Examiner* — Edward Chang
(74) *Attorney, Agent, or Firm* — Advent, LLP

(57) ABSTRACT

A financial instrument management system determines a current market rate of interest that is compared with an annual percentage yield of a financial instrument from a financial institution. The system processes (e.g., receives and/or presents) an early redemption request prior to a maturity date of the financial instrument. The early redemption request comprises a request for a payout equal to a current value of the financial instrument and a market value adjustment. The current value comprises the principal of the financial instrument plus accrued interest. The market value adjustment comprises a bonus portion such that the payout is greater than the current value of the financial instrument when the current market rate of interest is less than the annual percentage yield and/or a discount portion such that the payout is less than the current value when the current market rate of interest is greater than the annual percentage yield.

17 Claims, 7 Drawing Sheets

REPLACEMENT DRAWING

| | |
|---|---|
| CD$^{TWO}$ | 500 |
| DATE OF DEPOSIT | 5/27/2011 |
| DESIRED MATURITY DATE | 4/15/2015 |
| TERM TO MATURITY IN MONTHS | 47 |
| AMOUNT OF DEPOSIT | 75,000 |
| CUSTOMIZED CD APY | 1.87 |
| ESTIMATED VALUE AT MATURITY | $80,601 |
| POTENTIAL REDEMPTION DATE | 8/19/2011 |
| POTENTIAL REPLACEMENT INTEREST RATE FOR REMAINING TERM | 1.87% |
| ESTIMATED PRINCIPAL AND INTEREST AT REDEMPTION | $75,320 |
| ESTIMATED GAIN/(DISCOUNT) | - |
| ESTIMATED POTENTIAL VALUE AT POTENTIAL REDEMPTION DATE | 75,320 |
| POTENTIAL TOTAL CASH FLOW YIELD ON DEPOSIT | 1.87% |
| MONTHS HELD BEFORE REDEMPTION | 3 |

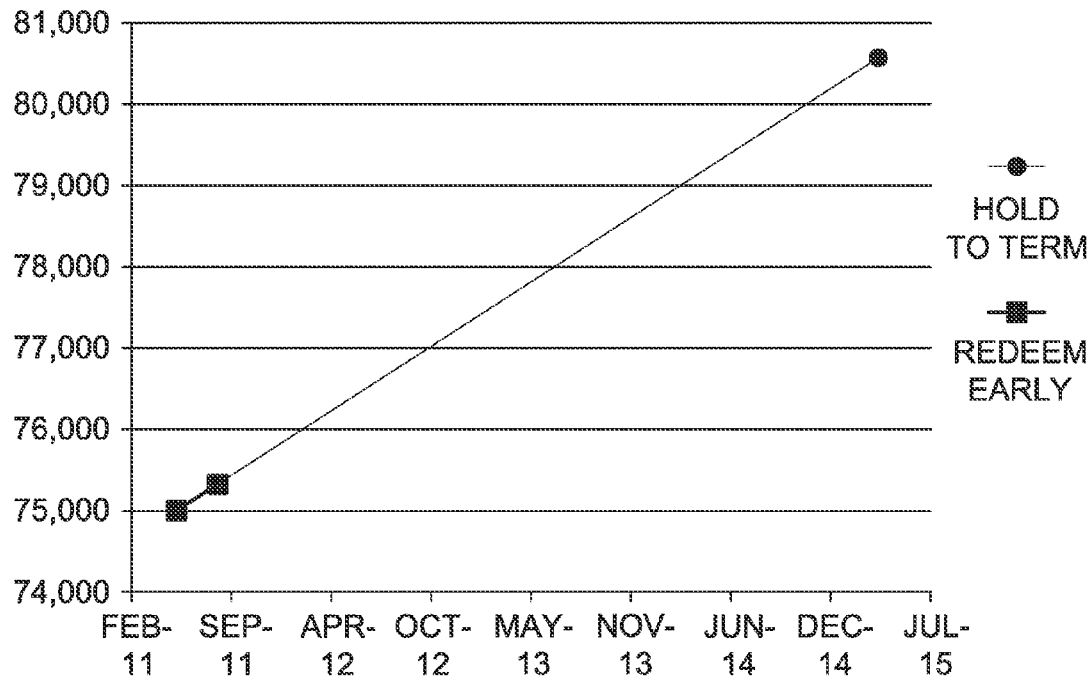

FIG. 5A

REPLACEMENT DRAWING

| | |
|---|---|
| CD TWO | ← 500 |
| DATE OF DEPOSIT | 5/27/2011 |
| DESIRED MATURITY DATE | 4/15/2015 |
| TERM TO MATURITY IN MONTHS | 47 |
| AMOUNT OF DEPOSIT | 75,000 |
| CUSTOMIZED CD APY | 1.87 |
| ESTIMATED VALUE AT MATURITY | $80,601 |
| POTENTIAL REDEMPTION DATE | 8/19/2011 |
| POTENTIAL REPLACEMENT INTEREST RATE FOR REMAINING TERM | 1.77% |
| ESTIMATED PRINCIPAL AND INTEREST AT REDEMPTION | $75,320 |
| ESTIMATED GAIN/(DISCOUNT) | 271 |
| ESTIMATED POTENTIAL VALUE AT POTENTIAL REDEMPTION DATE | 75,592 |
| POTENTIAL TOTAL CASH FLOW YIELD ON DEPOSIT | 3.47% |
| MONTHS HELD BEFORE REDEMPTION | 3 |

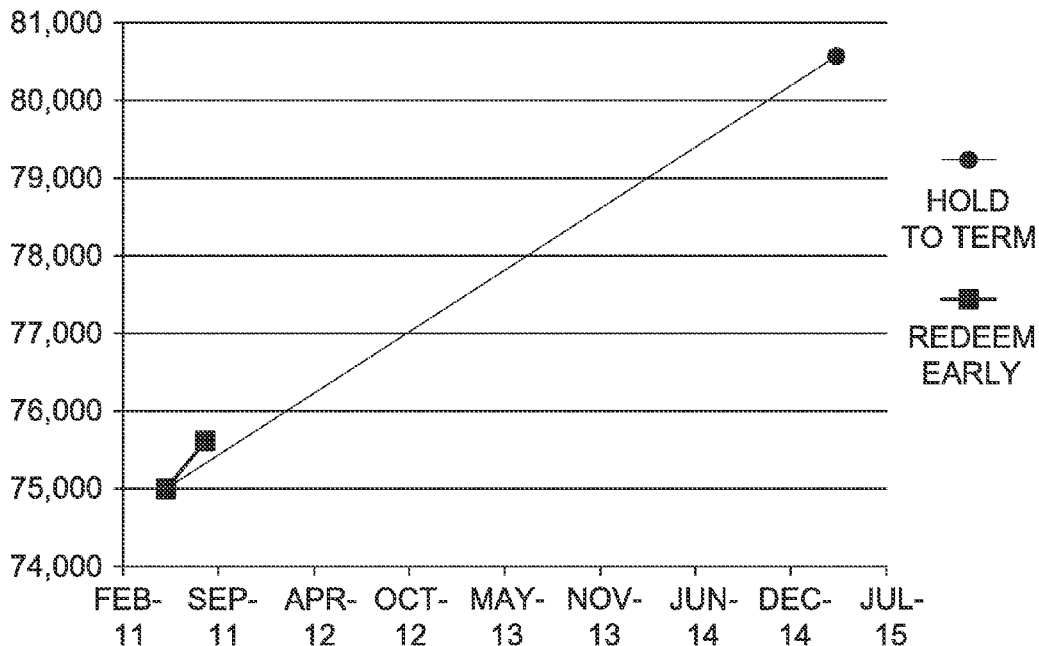

FIG. 5B

REPLACEMENT DRAWING

| | |
|---|---|
| $CD^{TWO}$ | ←500 |
| DATE OF DEPOSIT | 5/27/2011 |
| DESIRED MATURITY DATE | 4/15/2015 |
| TERM TO MATURITY IN MONTHS | 47 |
| AMOUNT OF DEPOSIT | 75,000 |
| CUSTOMIZED CD APY | 1.87 |
| ESTIMATED VALUE AT MATURITY | $80,601 |
| POTENTIAL REDEMPTION DATE | 8/19/2011 |
| POTENTIAL REPLACEMENT INTEREST RATE FOR REMAINING TERM | 1.97% |
| ESTIMATED PRINCIPAL AND INTEREST AT REDEMPTION | $75,320 |
| ESTIMATED GAIN/(DISCOUNT) | (270) |
| ESTIMATED POTENTIAL VALUE AT POTENTIAL REDEMPTION DATE | 75,051 |
| POTENTIAL TOTAL CASH FLOW YIELD ON DEPOSIT | 0.29% |
| MONTHS HELD BEFORE REDEMPTION | 3 |

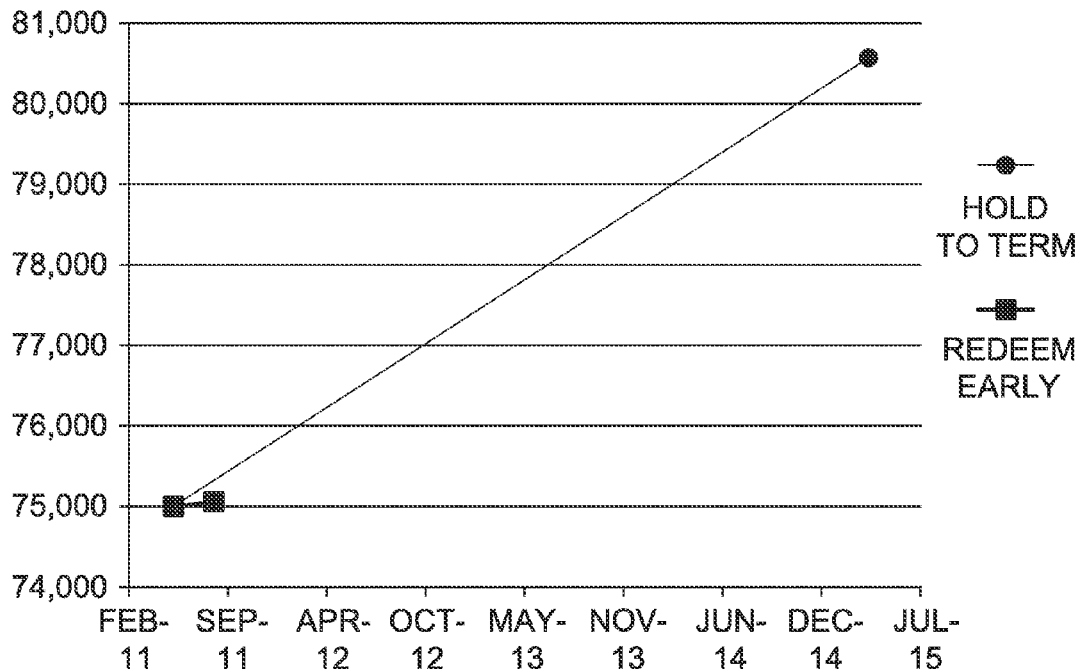

FIG. 5C

FINANCIAL INSTRUMENT MANAGEMENT SYSTEM

CROSS-REFERENCE TO RELATED APPLICATIONS

The present application claims the benefit under 35 U.S.C. §119(e) of U.S. Provisional Application Ser. No. 61/492,872, entitled METHODS AND SYSTEMS FOR PROVIDING AN INSURED CERTIFICATE OF DEPOSIT THAT CAN BE REDEEMED PRIOR TO MATURITY AT A FAIR MARKET VALUE, filed on Jun. 3, 2011, which is herein incorporated by reference in its entirety.

BACKGROUND

Financial instruments, particularly time certificates of deposit (CD) issued by financial institutions, such as banks, credit unions, and so forth, in the form of a contract between the depositor and the financial institution typically pay a fixed interest rate on a deposit for a fixed period of time after which redemption may occur without penalty. Such financial instruments (e.g. CDs) are typically not callable by the bank but are redeemable by the depositor before maturity, subject to an early withdrawal penalty. Moreover, in the United States, such financial instruments are required by the Truth in Savings Regulation DD to state, at the time of account opening, the penalty for early withdrawal. These penalties are commonly based on a number of months of interest, a percentage of the total interest that would accrue over the life of the deposit, a percentage of the remaining interest that would accrue for the remaining life of the deposit, or an economic recovery calculation that is based on the additional cost the financial institution would incur to replace the financial instrument (e.g., CD) at the current market rates of interest for the remaining period.

SUMMARY

Techniques are described for dynamically issuing a financial instrument, such as an insured certificate of deposit (CD) that can be redeemed prior to maturity at a current fair market value. In one or more implementations, the techniques may be implemented as a financial instrument management system that is configured to determine a current market rate of interest and compare the current market rate of interest with an annual percentage yield of a financial instrument from a financial institution. The financial instrument management system may process an early redemption request (e.g., received by the financial instrument management system from a depositor or presented to a depositor by the financial institution) prior to a maturity date of the financial instrument. The early redemption request comprises a request for a payout equal to a current value of the financial instrument and a market value adjustment. The current value comprises the principal of the financial instrument plus accrued interest. The market value adjustment comprises a bonus portion such that the payout is greater than the current value of the financial instrument when the current market rate of interest is less than the annual percentage yield and/or a discount portion such that the payout is less than the current value when the current market rate of interest is greater than the annual percentage yield.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIGS. 5A, 5B, and 5C are diagrammatic illustrations depicting example pro-forma statements that provide estimated potential future value and yield of a financial instrument, in particular an insured certificate of deposit (CD) at a future date prior to maturity of the financial instrument, wherein FIG. 5A illustrates the estimated future value and yield of the financial instrument when the market rate of interest remains unchanged from the fixed rate of interest of the financial instrument, FIG. 5B illustrates the estimated potential future value and yield when the market rate of interest is lower than the fixed rate of interest of the financial instrument, and FIG. 5C illustrates the estimated potential future value and yield when the market rate of interest is higher than the fixed rate of interest on the financial instrument.

DETAILED DESCRIPTION

Overview

Figure 1:
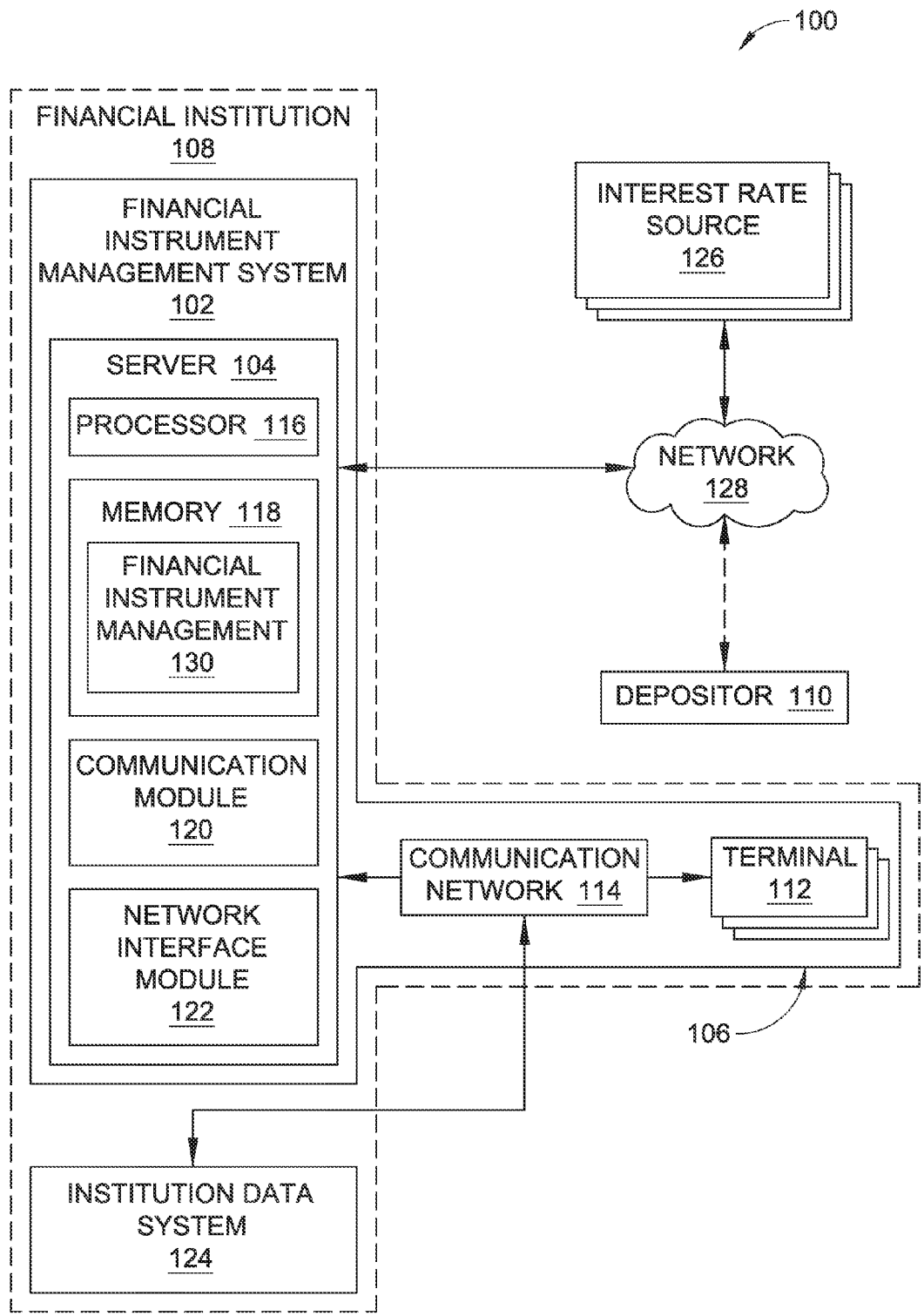
FIG. 1 is a block diagram illustrating an environment in an example implementation in which a financial instrument management system is operable to dynamically issue a financial instrument that can be redeemed prior to maturity at a current fair market value.

Since their introduction, certificates of deposit (CDs) have been issued by financial institutions, such as banks, credit unions, thrifts (e.g., savings & loan institutions), and so forth, as relatively simple financial instruments. Certificates of deposit provide secure, fixed income to their depositors at interest rates that are more attractive than interest rates commonly available for checking or savings accounts. Thus, the depositor investing in these financial instruments accepts reduced liquidity in exchange for additional income. The depositors generally acknowledge that there is a "substantial penalty for early withdrawal" and have accepted that limitation for the opportunity to obtain a higher yielding, insured, fixed rate instrument.

Certificates of deposit have historically provided financial institutions with a stable source of funds at a known interest cost. In this manner, the financial institutions may secure ("lock-in") interest margins on longer-term investments in loans and securities by utilizing certificate of deposit funding. Thus, the financial institutions have modeled their future earnings based on the certificate of deposit contracts they have with depositors to pay a fixed rate of interest for a fixed period of time.

Early redemption value comprises the secondary market value for fixed rate investment securities, such as bonds. Early Redemption Value is typically determined by calculating the present valuing of the cash flow of the investment security over the remaining term of the investment discounted by the current market yield. However, the present value method of valuation is more complex and difficult to calculate than a simple interest forfeiture penalty traditionally found in financial instruments, such as certificates of deposit (CDs). Interest forfeiture is readily calculated without a computing device, and has in the past been considered an appropriate penalty by many financial institutions for early redemption of certificates of deposit (CDs) by depositors. Some financial institutions having instead chosen to implement a fair market value or economic recovery cost analysis for early redemption of financial instruments. However, these institutions utilize this method only for determination of a penalty fee, and stop short of allowing the depositor to share in the benefit of any decreased cost to the financial institution arising from replacing, prior to maturity, the funding provided by the financial instruments (e.g., certificates of deposit (CDs)) that carry an interest rate that is relatively high compared to current market interest rates. Currently, the only governmental regulation for redemption prior to maturity of Federal Deposit Insurance Corporation (FDIC) insured certificates of deposits (CDs) is a penalty of all the interest if the CD is withdrawn in the first seven (7) days following issuance. After this initial seven (7) day period, additional early withdrawal terms can be determined by the individual financial institution.

Early withdrawal penalties currently imposed by financial institutions for financial instruments, such as certificates of deposit (CDs) have generally been effective in discouraging early redemption of the instruments in the absence of significant interest rate increases. Financial institutions have thus relied on the penalties to inhibit the early withdrawal of time deposits. However, the penalties ignore the economic impact on the financial institution and/or the depositor by consistently penalizing the depositor for early withdrawal regardless of the current market rate of interest. Consequently, the static nature of these penalties diminishes the attractiveness of these financial instruments as an investment option for depositors.

Accordingly, a financial instrument management system is described that implements techniques for dynamically issuing a financial instrument that can be redeemed prior to maturity at a current fair market value. The financial instrument may be any financial instrument that has a fixed term (subject to early redemption prior to maturity in accordance with the present disclosure), and a fixed interest rate to maturity. The financial instrument may be insured (e.g., by the Federal Deposit Insurance Corporation (FDIC), the National Credit Union Association (NCUA), a non-governmental agency, and so forth), but may also be uninsured. Example financial instruments include, but are not limited to fixed interest rate to maturity certificates of deposit (CD). The financial instrument management system may be configured to determine a current market rate of interest and compare the current market rate of interest with an annual percentage yield of a financial instrument from a financial institution. The financial instrument management system may process an early redemption request, either received by the financial instrument management system from a depositor or presented to a depositor by the financial institution, prior to a maturity date of the financial instrument. The early redemption request comprises a request for a payout equal to a current value of the financial instrument and a market value adjustment. The current value comprises the principal of the financial instrument plus accrued interest. The market value adjustment comprises a bonus portion such that the payout is greater than the current value of the financial instrument when the current market rate of interest is less than the annual percentage yield and/or a discount portion such that the payout is less than the current value when the current market rate of interest is greater than the annual percentage yield.

Financial instruments in accordance with the present techniques give depositors an option that provides an enhanced economic value compared to traditional certificates of deposit (CD) without compromising the economic position of the financial institution. Thus, depositors may continue to enjoy the benefits of fixed rate financial instruments, such as fixed rate certificates of deposit (CD)—simplicity, guaranteed yield, and insurance (e.g., FDIC insurance); while enjoying an opportunity to redeem the instruments early with a potential premium (rather than a penalty) when current market interest rates allow the financial institution to replace the deposit at lower cost.

In the following discussion, an example financial instrument management system environment is first described. Exemplary procedures are then described that may be employed with the example environment, as well as with other environments and devices without departing from the spirit and scope thereof.

Example Implementation

FIG. 1 illustrates an example environment 100 that includes a financial instrument management system 102 which is operable to perform the techniques discussed herein. Thus, the financial instrument management system 102 may be operable to dynamically issue a financial instrument that can be redeemed prior to maturity at a current fair market value (and after the initial period (e.g., seven (7) day period) mandated by the FDIC, or like insuring organization). The financial instrument management system 102 may be implemented in a number of ways. For example, the financial instrument management system 102 may be implemented as a server 104 in a client-server network 106 employed by a financial institution 108, such as a bank, a credit union, a thrift (e.g., a savings & loan institutions), and so forth that is capable of issuing financial instruments to clients of the financial institution (depositors 110). The server 104 may be configured in a variety of ways. For instance, the server 104 may be configured as one or more server computers that are capable of communicating with one or more client devices, such as terminals 112 (e.g., a workstation, a personal computer, a laptop computer, a tablet computer, a smart phone, combinations thereof, and so forth) over a wired or wireless communication network 114. However, the financial instrument management system 102 may also be implemented as an individual ("stand alone") computer device (not shown), such as a personal computer, a laptop computer, a tablet computer, a smart phone, combinations thereof, and so forth, that is independent of a client-server network 106.

As shown, the financial instrument management system 102, when implemented as a server 104 (or other computing device), includes a processor 116, a memory 118, a communication module 120, and a network interface 122. The processor 116 provides processing functionality for the financial instrument management system 102. The processor 116 may include any number of processors, micro-controllers, or other processing systems and resident or external memory for storing data and other information accessed or generated by the server 104 (or other computing device). The processor 116 may be configured to execute one or more software programs (e.g., modules) that implement techniques described herein. The processor 116 is not limited by the materials from which it is formed or the processing mechanisms employed therein and, as such, may be implemented via semiconductor(s) and/or transistors (e.g., electronic integrated circuits (ICs)), and so forth.

The memory 118 is an example of a non-transitory computer storage device that provides storage functionality to store various data associated with the operation of the test system, such as the software program and code segments mentioned above, computer instructions, and/or other data to instruct the processor 116 and other elements of the system 102 to perform the techniques described herein. Although a single memory 118 is shown, a wide variety of types and combinations of memory may be employed. The memory 118 may be integral with the processor 116, stand-alone memory, or a combination of both. The memory 118 may include, for example, removable and non-removable memory elements, such as RAM, ROM, Flash (e.g., SD Card, mini-SD card, micro-SD Card), magnetic, optical, USB memory devices, and so forth. In embodiments, the memory 118 may include removable ICC (Integrated Circuit Card) memory, such as provided by SIM (Subscriber Identity Module) cards, USIM (Universal Subscriber Identity Module) cards, UICC (Universal Integrated Circuit Cards), and so on.

In client-server network 106 implementations, the server 104 may be communicatively coupled to one or more terminals 112, as well as other data systems 124 operated by the financial institution 108, over the communication network 114 through the communication module 120 included in the server 104. Similarly, the server may be communicatively coupled to external data sources, such as webpages, data repositories, and so forth (e.g., interest rate sources 126), via an external network 128, through the network interface module 122. The communication module 120 and network interface module 122 may be representative of a variety of communication components and functionality, including, but not limited to: data ports; software interfaces and drivers; networking interfaces; data processing components; a browser; one or more antennas; a transmitter and/or receiver (e.g., radio frequency circuitry); a wireless radio; combinations thereof; and so forth.

The communication and/or external network(s) 114, 128 may comprise a variety of different types of networks and connections, including, but not limited to: the Internet; an intranet; a satellite network; a cellular network; a mobile data network; wired and/or wireless connections; combinations thereof; and so forth. Wireless networks may comprise any of a plurality of communications standards, protocols and technologies, including, but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS)), or any other suitable communication protocol. In an implementation, the networks 114, 124 may comprise a single network (e.g., the Internet). In other implementations, the networks 114, 124 may comprise multiple networks (e.g., a secure intranet and the Internet) that facilitate communication between the server 104, client devices 110, data systems 124 operated by the financial institution 108, external data sources (e.g., interest rate sources 126), and so forth.

The financial instrument management system 102 is illustrated as including a financial instrument management module 130, which is storable in memory 118 and executable by the processor 116. The financial instrument management module 130 represents functionality to dynamically issue a financial instrument that can be redeemed prior to maturity at a current fair market value. For example, the financial institution 108 may promulgate marketing media (e.g., the financial institution 108 may furnish advertisements via television, radio, print media, emails, websites, and so forth; may provide pamphlets and other descriptive materials, and so forth) to market the financial instrument (e.g., a fair market certificate of deposit (CD)) to prospective depositors 110. Examples of such marketing materials are illustrated in Exhibits 1 and 2.

When prospective depositors 110 respond to such marketing materials, or, alternately independently inquire about the financial instrument without viewing the marketing materials, the prospective depositors 110 may be encouraged to deposit funds into the financial instrument by selecting from range of maturity terms. In implementations, the range of maturity terms may be any term between five (5) months and five (5) years. However, it is contemplated that a maturity term of less than five (5) months and/or greater than (5) years may also be furnished.

To dynamically price the financial instruments with a fresh daily, mutually fair interest rate across the spectrum of available maturity dates, representatives of the financial institution 108 may access the financial instrument management system 102 (e.g., via terminal 112) to ascertain current wholesale market interest rates on a predetermined interval basis, such as a near-continuous basis. For example, in one or more implementations, the financial instrument management module 130 may further configure the financial instrument management system 102 to monitor the current market rate of interest from one or more interest rate sources 126 via network 124. The interest rate sources 126 may include information received from one or more wholesale interest rate markets. Such wholesale interest rate markets may include the Federal Home Loan Bank's fixed rate advances, such as Federal Home Loan Bank of Des Moines (website: http://members.fhlbdm.com/member-tools/advance-rates/3/); the Federal Home Loan Bank of Dallas (website: https://www.fhlb.com/rates.html#Rates); the FDIC weekly national rates and rate caps (website: http://www.fdic.gov/regulations/resources/rates/index.html); the National Credit Union Administration rate data (website: http://www.ncua.gov/DataApps/Pages/CUBNKMain.aspx); and so forth.

The financial institution 108 may further supply parameters to the interest rate source 126, such as data that specifies the financial institution's currently desired pricing spreads relative to the relevant current market interest rates. This information may, for example, be input by a representative of the financial institution 108 into the financial instrument management system 102 (e.g., via terminal 112). For example, the financial instrument management module 130 may include functionality to cause the system 102 to transmit this information to the interest rate sources 126 via network 128.

| XYZ Bank proudly introduces CD$^{TWO}$ Certificate of Deposit (The second generation CD) |
|---|
| That's right; other CDs have substantial penalties for early withdrawal. You may find some "no-penalty" CDs. But, the CD$^{TWO}$ certificate of deposit gives you the opportunity for a bonus if interest rates decline and you withdraw early. A bonus means you get all of your principal and interest plus a bonus. |
| Sound too good to be true? Not at all! When our bank commits to your fixed rate of interest on a CD we expect to pay you the full interest to maturity. If interest rates decline and you withdraw early we can replace your CD at a lower cost. CD$^{TWO}$ certificate of deposit terms allow us to share the benefit of falling interest rates with you. |
| So…regardless of what interest rates do in the future, your CD$^{TWO}$ certificate of deposit gives you FDIC insured guaranteed interest. Any early redemption bonus occurs only if interest rates decline and any early redemption is completely your choice. If the bank can replace your CD$^{TWO}$ certificate of deposit at the same interest rate there will be no penalty or bonus. If you anticipate interest rates will not rise for a period of time, you can invest in a longer-term CD$^{TWO}$ certificate of deposit and redeem it before maturity – comparable to a fixed-rate bond. |
| XYZ Bank believes in sharing the benefits of innovation with our customers. The CD$^{TWO}$ certificate of deposit is our latest example of our approach. The CD$^{TWO}$ certificate of deposit adds to our product options and does not replace any of our conventional CDs. |
| Contact our CD$^{TWO}$ certificate of deposit specialists to get a full demonstration and take advantage of this great new opportunity! |
| *Penalty for the first 7 days is 7 days of interest. After the first 7 days, the penalty/bonus is determined by the Economic Replacement Value (ERV). The Economic Replacement Value is an estimate of the interest cost to us if we were to replace a CD that is withdrawn early with another deposit having a term that is comparable to the remaining term of the original CD. If interest rates have risen, then the cost of the new deposit will be higher. If interest rates have fallen, then the cost of the new deposit will be lower. |

EXHIBIT 1

| |
|---|
| At XYZ Bank, we think differently. That's why we're among the first banks to issue the second generation of CD accounts. Read the testimonial below for a glimpse of what we have to offer! |
| Letter from XYZ Bank customer… |
| "Thank you XYZ Bank! |
| I opened one of your new CD$^{TWO}$ certificate of deposit accounts. |
| My CD$^{TWO}$ certificate of deposit was opened on April 28, 2011 with $2,500 and redeemed on May 26th. On top of the interest I earned, there was a $36 bonus for redeeming early. The $36 bonus on my XYZ Bank CD$^{TWO}$ certificate of deposit was more than I would have earned after years of interest at other banks. |
| I opened the CD$^{TWO}$ certificate of deposit because I understood I could get my principal and interest out at any time and I'd have a penalty for early withdrawal only if interest rates went up. When interest rates went down that created my bonus. |
| Everyone should know about this." |
| (Principal and interest is guaranteed at maturity. Early redemption yields will fluctuate and are not guaranteed.) |

EXHIBIT 2

The financial institution 108 may then issue the financial instrument and accept funds for deposit in the amount of the principal from the depositor 106. Upon issuance, the financial institution 108 may provide an account disclosure to the depositor 110 describing terms and conditions under which the financial instrument is issued. An example account disclosure is provided in Exhibit 3. The account relationship may be maintained (tracked) via one or more data systems of the financial institution 108. Information about the financial instrument may be retrieved from this data system 126 by the financial instrument management system 102 (e.g., via functionality furnished by the financial instrument management module 130). Here is example implementation of the account disclosure:

*Early Withdrawal Fee* – We calculate the early withdrawal fee as follows:

For deposits withdrawn within the first 7 days, a fee will be 7 days' interest or the replacement fee calculation (see below), whichever produces the greatest fee to the depositor.

For all early withdrawals after 7 days on deposit, the value at withdrawal will be determined by the replacement fee or bonus calculation.

*Replacement Fee or Bonus Calculation* – We calculate the replacement fee or bonus as follows:

1) We will calculate what would have been the total value of your $CD^{TWO}$ certificate of deposit * account at maturity if interest had been allowed to compound from the date of early withdrawal to maturity.

2) We determine the highest interest rate we currently offer on a "comparable" replacement deposit account in the amount of your current time deposit with a term equal to or less than the number of days remaining to maturity. "Comparable" is defined as having a maturity term less than 91-days longer than the remaining term of the original time deposit. For example, the replacement interest rate for a CD with 300 days remaining to maturity would be the highest currently offered interest rates on deposit accounts with maturity terms from 0 days through 391 days.

3) We calculate the amount of principal that could be invested today at the interest rate determined by step 2 that would yield the same total compounded value of your $CD^{TWO}$ certificate of deposit * account at maturity as determined by step 1. This is the amount the depositor will receive from the withdrawal.

4) The difference between the value determined in step 3 and the current principal and accrued interest is the replacement fee or bonus.

EXHIBIT 3

At dates prior to maturity, a depositor 110 interested in early redemption can request a fair market value indication for a financial instrument from the financial institution 108. The financial institution 108 may provide this indication in a variety of ways. For instance, the financial institution 108 may provide a pro-forma early redemption statement 500 (see FIGS. 5A through 5C) to the depositor 110, which may be furnished via mail, email, webpage display, text message, verbal communication, and so forth. In implementations, the financial instrument management module 130 may include functionality to cause a pro-forma statement 500 to be provided to a depositor 110 of the financial instrument. The pro-forma statement may include information describing the consequences of early redemption the financial instrument including, but not limited to: the payout, the current value of the financial instrument, and the market value adjustment of the financial instrument. In an implementation, the financial instrument management module 130 may proactively produce and provides statements of market value (such as pro-forma statements 500, shown in FIGS. 5A, 5B, and 5C) to the depositor 110 on a predetermined interval basis (dictated by the financial institution 108 or selectable by the depositor 110).

The depositor 110 may request early redemption of the financial instrument. In implementations, the financial instrument management module 130 may include functionality to receive the early redemption request (e.g., comprising a request for a payout) prior to the maturity date of the financial instrument. The financial institution 108 may also present depositors 110 with a request for early redemption prior to the maturity date. Thus, the financial instrument management module 130 may further include functionality to cause an early redemption request (e.g., comprising a request furnish a payout) to be presented to the depositor 110 prior to the maturity date of the financial instrument.

A representative of the financial institution 108 may determine a discount rate for early redemption of the financial instrument 106 by accessing the financial instrument management system 102 (e.g., via a terminal 112). The financial instrument management system 102 considers the current wholesale market interest rates, obtained from the interest rate sources 126 on a predetermined interval basis via the external network 124 and the financial institution's current desired pricing spreads relative to the relevant market interest rates.

The financial instrument management system 102 uses the current market rate of interest for a replacement financial instrument (e.g., the discount interest rate), the current value of the financial instrument, the fixed interest rate on the financial instrument, and the remaining term to determine the current market value (e.g., payout) available to the depositor 110 in the event of redemption prior to its maturity date. For example, in one or more implementations, the financial instrument management module 130 may include functionality configured determine a payout for redemption of a financial instrument having a maturity date, wherein the redemption occurs prior to the maturity date of the financial instrument. In embodiments, the payout comprises a current value of the financial instrument and a market value adjustment, wherein the current value of the financial instrument is equal to a principal of the financial instrument plus an accrued interest and the market value adjustment comprises a bonus portion such that the payout is greater than the current value of the financial instrument when the current market rate of interest is less than the annual percentage yield and/or a discount portion such that the payout is less than the current value when the current market rate of interest is greater than the annual percentage yield.

The financial instrument management module 130 may further include functionality to determine the market value adjustment. This determination may be made by calculating a total value of the financial instrument at maturity if interest is allowed to compound from a date when the early redemption request was received to maturity of the financial instrument. The total value of the financial instrument at maturity ("V") may be calculated from Equation 1:

$$V = P_O (1 + r_O)^{t_M} \qquad \text{EQUATION 1}$$

where "$P_O$" is the principal of the original financial instrument, "$r_O$" is the interest rate (annual percentage yield) of the original financial instrument, and "$t_M$" is the time period until maturity as discussed above.

The current market rate of interest for a replacement financial instrument that is comparable to the financial instrument is then determined wherein the replacement financial instrument has a term equal to or less than the number of days remaining to maturity of the financial instrument.

An amount of principal that can be invested at the current market rate of interest for the term to yield the total value is calculated. The amount of principal ("$P_R$") that can be invested may be calculated from Equation 2:

$$P_R = V / (1 + r_R)^{t_R} \qquad \text{EQUATION 2}$$

where V is the value of the original financial instrument at maturity calculated using Equation 1 above, $r_R$ is the current market rate of interest (replacement interest rate), and $t_R$ is the term of the replacement financial instrument. Next, the amount of principal is subtracted from the current value of the financial instrument to yield the market value adjustment. The following examples illustrate determination of the market value adjustment (e.g., replacement fee or replacement bonus).

Example 1: A $10,000 time certificate of deposit (CD) established for 36 months at 4% is redeemed after 12 months. To calculate the market value adjustment (e.g., replacement fee or bonus), the total value at maturity if interest had been allowed to compound to maturity is calculated (generally represented by the following): $10,000×1.04³=$11,248.64. The highest interest rate offered on a time certificate of deposit (CD) having a "comparable" replacement term or shorter term is determined. If this interest rate is 6%, the investment for 24 months that would increase to be $11,248.64, is calculated as: $11,248.64/1.06²=$10,011.25. Because this value is less than the total of principal and accrued interest, the replacement fee is calculated to be the total of principal and accrued interest of $10,400 less the investment required at the replacement interest rate of $10,011.25=$388.75. The depositor would receive $10,011.25 upon redemption of the certificate of deposit (CD).

Example 2: A $10,000 time certificate of deposit (CD) established for 36 months at 4% is redeemed after 12 months. To calculate the market value adjustment (e.g., replacement fee or bonus), the total value at maturity if interest had been allowed to compound to maturity is calculated (generally represented by the following): $10,000×1.04³=$11,248.64. The highest interest rate offered on a time certificate of deposit (CD) having a "comparable" replacement term or shorter term is determined. If this interest rate is 2%, the investment for 24 months that would increase to be $11,248.64, is calculated as: $11,248.64/1.02²=$10,811.84. Because this value is greater than the total of principal and accrued interest, the replacement bonus is calculated to be the investment of $10,811.84 required at the replacement interest rate less the total of principal and accrued interest of $10,400=$411.84. The depositor would receive $10,811.84 upon redemption of the certificate of deposit (CD).

In implementations, the issuing financial institution 108 may extract value via pricing differential from the additional value proposition arising from the potential of redemption prior to maturity exceeding the combined current principal and interest value of the financial instrument. In recognition of this additional value opportunity, the financial institution 108 can justify a lower interest rate for the financial instrument compared to a conventional certificate of deposit (CD) with a traditional penalty structure for early withdrawal. This pricing differential may directly lower the cost of funds for the issuing financial institution 108 without compromising the volume or composite maturity of the funding portfolio.

Figure 2A:
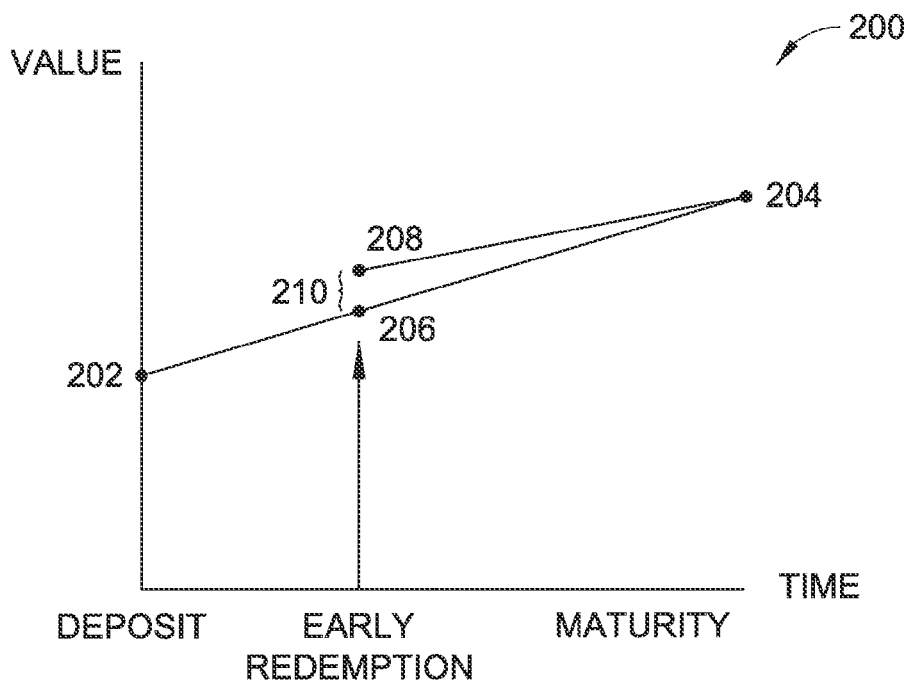
FIGS. 2A and 2B are graphs illustrating how the value of a financial instrument grows from the date of deposit to maturity date, and can be redeemed prior to maturity, whereupon the present value of the remaining cash flow based on market rates of interest may be calculated to determine an early redemption value for the financial instrument.
Figure 2B:
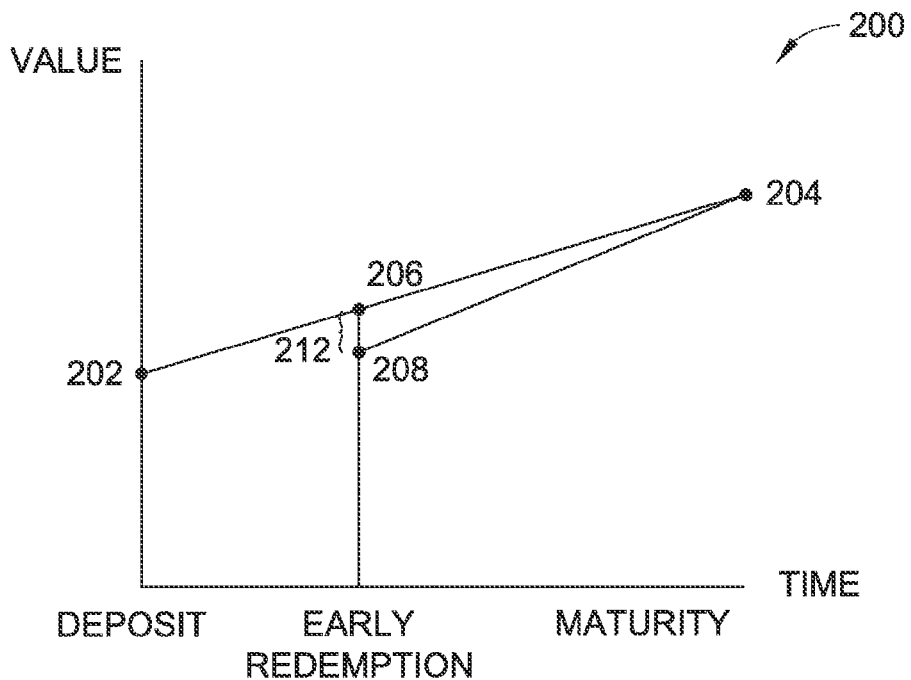

FIGS. 2A and 2B are graphs 200 that illustrate how the value of a financial instrument grows from the date of deposit to maturity date, and can be redeemed prior to maturity, whereupon the present value of the remaining cash flow based on market rates of interest may be calculated to determine an early redemption value for the financial instrument.

Economic considerations for financial institutions paying fixed rate obligations dictate that when market rates decline it would be in the best interest of a financial institution (such as financial institution 108 of FIG. 1) to allow for the termination of the original contract for the financial instrument even if the financial institution paid a bonus at the time of redemption (withdrawal) depending upon the differential in interest rates and the remaining time of the contract. However, conventional time certificates of deposit (CD) make no provision for early redemption with bonus. This restricted capability makes conventional CDs inferior to investors compared to other fixed-rate investment alternatives.

As shown in FIGS. 2A and 2B, the financial institution prepares for and plans to pay the fixed rate of interest for the term of the financial instrument. A deposit creating the financial instrument is made in a specific amount of value 202. The financial institution expects to pay interest to the depositor so that the value of the deposit grows to maturity 204. This value may accrue within the deposit account (compounding) or outside the deposit account as the bank pays the depositor. At a time prior to maturity 206, the terms of the account and the financial institutions replacement funding cost alternatives can be used to determine the present value 208 of the financial instrument that would result in the same total value of the financial instrument at maturity 204. The difference between the calculated present value of the original total deposit value at maturity and the principal and total accrued value at the time of early redemption comprises the loss 210 or gain 212 due to the early redemption of the financial instrument.

By using the discounted present value of the financial instruments to determine early redemption value, a financial institution (such as financial institution 108 of FIG. 1) can pay an equivalent amount of interest by retaining the current financial instrument, or by replacing the financial instrument with a current market rate instrument. The financial institution 108 is thereby economically indifferent between retaining the original financial instrument and allowing the original depositor 110 to redeem the instrument with a fair market value redemption based on the discount rate of the required replacement deposit for the remaining term. The techniques described herein provide for the potential of a bonus for early withdrawal that creates a more attractive deposit investment, while providing a balanced value proposition for both the depositor 110 and the financial institution 108.

In an implementation, the financial instrument management module 130 may further include functionality to cause the distribution of an account balance of a certificate of deposit over multiple payments of the principal. Typically, a certificate of deposit matures with one payment of the total principal and accrued interest. In this implementation (e.g., fair market value structure), the financial institution 108 may offer an account, or a financial instrument, that allows for multiple principal payments during the life (e.g., maturity) of the account. Thus, this type of account allows for simultaneously maintaining economic fairness to both the financial institution 108 and the prospective depositor 110 (e.g., potential owner of the account). This allows for the parties (the financial institution 108, the prospective depositor 110) to create accounts, or a customized payment structure instrument, that have a customized payment structure to accommodate the needs of the prospective depositor 110. For example, a depositor could create an account with an initial $300,000 deposit. The depositor could engage the financial institution 108 to create a customized payment structure instrument that distributes a principal payment over a pre-determined time period (e.g., every week, every month, etc.). It is contemplated that the principal payments may be the same principal payment every time period (e.g., $500 principal payment every week), or the principal payments may vary over the time period (e.g., $500 principal payment every three (3) weeks with a $6,000 principal payment ever fourth ($4^{th}$) week.

Each account includes a contractual maturity date, and the potential depositor 110 could establish a withdrawal schedule to meet the depositor's anticipated needs. If no cash is withdrawn prior to maturity, the account would function as a typical market value time deposit. Accounts having multiple principal payments would function as the financial equivalent of a series of individual market value time deposit accounts having maturity dates one each payment date. However, the parties would maintain only a singular account configured to have a planned cash flow and value maintenance for the bank. Any additional (extra) withdrawal requests (additional principal payments in addition to the pre-determined time period principal distributions) by the depositor from the contractual cash flow would cause depletion of the final account values based upon a current replacement cost at time of the additional payment to maturity date.

Generally, any of the techniques described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the financial instrument management system 102 of FIG. 1 can be wired, wireless, or some combination thereof. In the case of a software implementation, for instance, the module represents executable instructions that perform specified tasks when executed on a processor, such as the processor 116 of the server 104 of the financial instrument management system 102 shown in FIG. 1. The executable instructions (e.g., program code) can be stored in one or more non-transitory computer storage devices, an example of which is the memory 118 associated with the server 104 of the financial instrument management system 102 of FIG. 1.

Example Procedures

The following discussion describes techniques to facilitate dynamically issuing a financial instrument that can be redeemed prior to maturity at a current fair market value. Aspects of each of the procedures may be implemented in hardware, firmware, or software, or a combination thereof.

The procedures are shown as a set of blocks that specify operations performed by one or more devices and are not necessarily limited to the orders shown for performing the operations by the respective blocks. Thus, the blocks may be implemented as executable instructions that perform specified tasks when executed on a processor, such as the processor 116 of the server 102 of the financial instrument management system 102 shown in FIG. 1. The executable instructions (e.g., program code) can be stored in one or more non-transitory computer storage devices, an example of which is the memory 118 associated with server 104 of the financial instrument management system 102 of FIG. 1. Accordingly, in portions of the following discussion, reference will be made to the environment 100 of FIG. 1.

Figure 3:
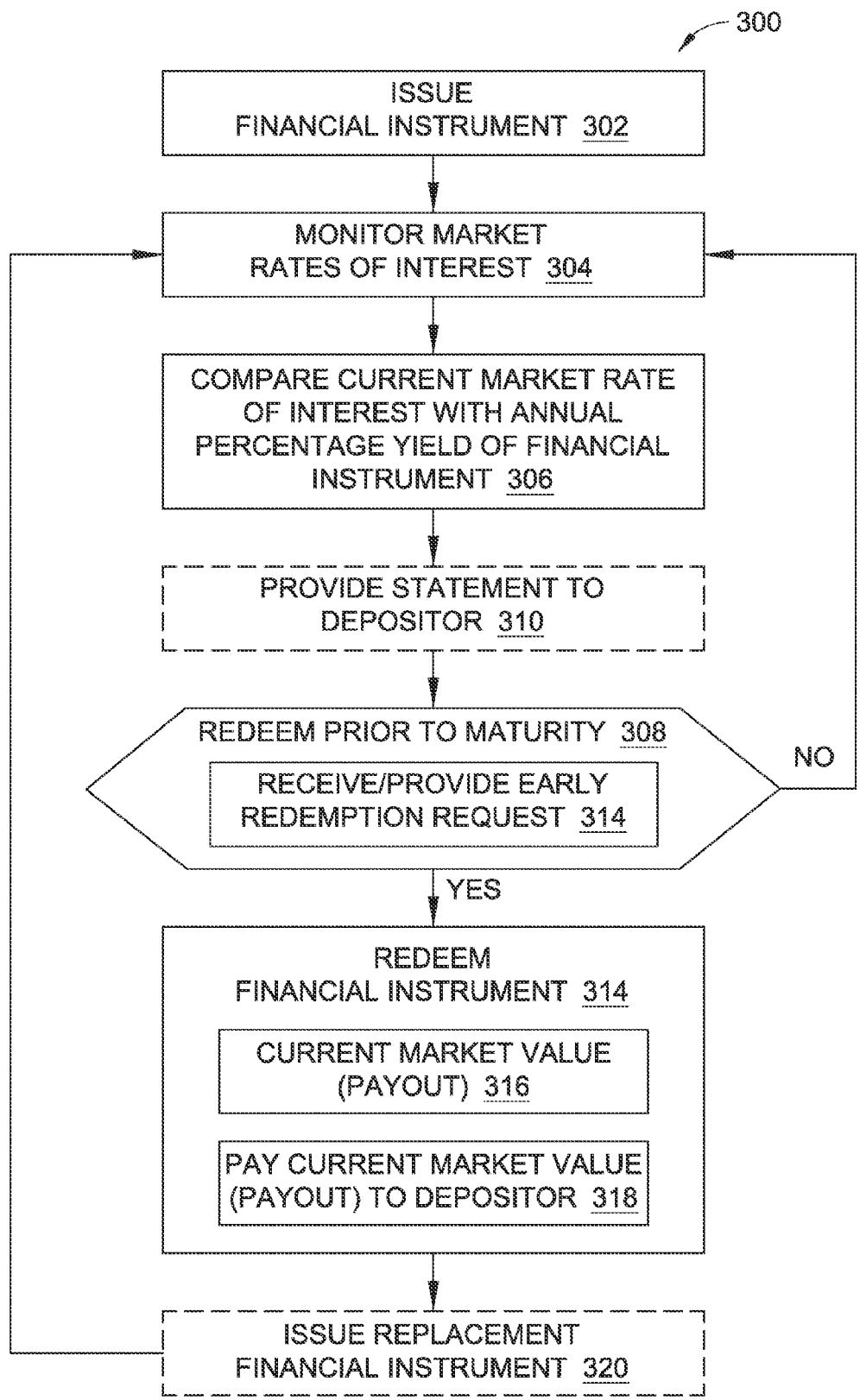
FIG. 3 is a flow diagram illustrating a procedure in an example implementation to dynamically issue a financial instrument that can be redeemed prior to maturity at a current fair market value.

FIG. 3 depicts a procedure 300 in an example implementation in which a financial instrument that can be redeemed prior to maturity at a current fair market value is issued and/or redeemed by a financial institution, such as a bank, credit union, thrift, and so forth. As shown, the financial institution issues the financial instrument (Block 302). For example, the financial institution may promulgate marketing media as described above in the discussion of FIG. 1 to market the financial instrument to prospective depositors. Examples of such marketing materials are illustrated in Exhibits 1 and 2. When prospective depositors respond to such marketing materials, or, alternately independently inquire about the financial instrument without viewing the marketing materials, the prospective depositors may be encouraged to deposit funds into the financial instrument by selecting from range of maturity terms. In implementations, the range of maturity terms may be any term between five (5) months and five (5) years. However, it is contemplated that a maturity term of less than five (5) months and/or greater than (5) years may also be furnished. The financial institution may then issue the financial instrument and accept funds for deposit in the amount of the principal from the depositor. Upon issuance, the financial institution may provide an account disclosure to the depositor describing terms and conditions under which the financial instrument is issued. An example account disclosure is provided in Exhibit 3. The account relationship may be maintained (tracked) via one or more data systems of the financial institution.

The market rates of interest is monitored (Block 304) by the financial institution. For example, the financial institution may ascertain (e.g., via the financial instrument management system 102) current wholesale market interest rates on a predetermined interval basis, such as a near-continuous basis. Sources of wholesale market interest rates may include, but are not limited to: the Federal Home Loan Bank's fixed rate advances, such as Federal Home Loan Bank of Des Moines (website: https://www.fhlbdm.com/rates/rates.pdf); the Federal Home Loan Bank of Dallas (website: https://www.fhlb.com/rates.html#Rates); the FDIC weekly national rates and rate caps (website: http://www.fdic.gov/regulations/resources/rates/); the National Credit Union Administration rate data (website: http://www.ncua.gov/DataServices/BankRate Data/index.aspx), and so forth. The financial institution may supply parameters, such as data that specifies the financial institution's currently desired pricing spreads relative to the relevant current market interest rates.

The current market interest rate may then be compared to the annual percentage yield of a replacement financial instrument (Block 306), and a determination made whether to redeem the financial instrument prior to maturity (Decision Block 308). For instance, a depositor interested in early redemption of a financial instrument can request a fair market value indication from the financial institution. This indication may be furnished in the form of a statement provided to depositor (Block 310). FIGS. 5A, 5B, and 5C illustrate an example pro-forma early redemption statement 500 furnished via mail, email, webpage display, text message, verbal communication, and so forth. The pro-forma statement may include information describing the consequences of early redemption the financial instrument including, but not limited to: the payout, the current value of the financial instrument, and the market value adjustment of the financial instrument as discussed herein. In an implementation, the financial instrument management module 130 may proactively provide statements of market value (such as pro-forma statements 500, shown in FIGS. 5A, 5B, and 5C) to the depositor on a predetermined interval basis (dictated by the financial institution or selectable by the depositor).

If a determination is made not to redeem the financial instrument prior to maturity ("NO" at Decision Block 308), for example when early redemption would not benefit the depositor and/or the financial institution due to the current market interest rate, the financial institution and/or the depositor may continue to monitor the market rate of interest (Block 304) until the financial instrument reaches maturity or until a more opportune time for early redemption occurs. However, when a determination is made to redeem the financial instrument prior to maturity ("YES" at Decision Block 308), the financial institution may redeem the financial instrument (Block 312) for the depositor. For example, a depositor may provide an early redemption request (e.g., comprising a request for a payout) prior to the maturity date of the financial instrument that may be received by the financial institution (Block 314). The financial institution may also present depositors with a request for early redemption prior to the maturity date (Block 314).

A current market value (payout) available to the depositor in the event of redemption of the financial instrument prior to its maturity date may be calculated (Block 316) for early redemption of the financial instrument. For example, the current market rate of interest for a replacement financial instrument (e.g., the discount interest rate), the current value of the financial instrument, the fixed interest rate on the financial instrument, and the remaining term may be used to determine the payout for redemption of a financial instrument prior to the maturity date of the financial instrument.

In FIG. 3, calculation of the current market value (payout) available to the depositor in the event of redemption of the financial instrument prior to its maturity date (Block 316) is illustrated as being performed during redemption of the financial instrument (Block 312). However, it is contemplated that the current market value (payout) may be calculated at any time during method 300. For example, the current market value (payout) may be calculated when comparing the current market interest rate to the annual percentage yield of a replacement financial instrument (Block 306), when determining whether to redeem the financial instrument prior to maturity (Decision Block 308), to furnish a statement to the depositor, e.g., so that the current market value (payout) is included in the statement (Block 310), and so forth.

In implementations, the current market value (payout) is comprised of a current value of the financial instrument and a market value adjustment. The current value of the financial instrument is equal to a principal of the financial instrument plus an accrued interest. The market value adjustment comprises a bonus portion such that the payout is greater than the current value of the financial instrument when the current market rate of interest is less than the annual percentage yield and/or a discount portion such that the payout is less than the current value when the current market rate of interest is greater than the annual percentage yield.

Figure 4:
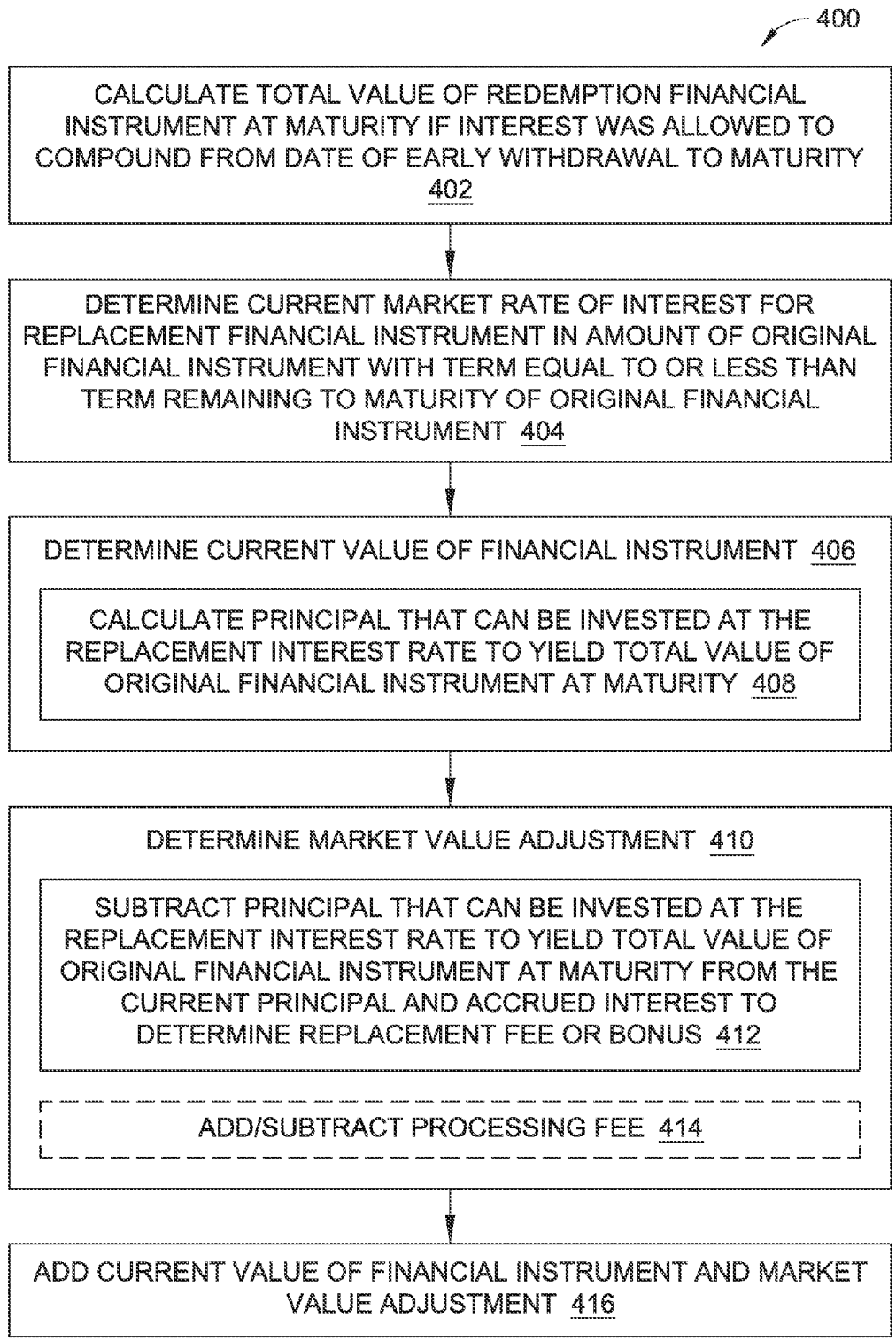
FIG. 4 is a flow diagram illustrating a method for determining a market value adjustment for redemption of the financial instrument in response to an early redemption request in accordance with the method of FIG. 3.

FIG. 4 illustrates a method 400 for determining the current market value of a financial instrument for early redemption of the financial instrument in accordance with the method 300 of FIG. 3. As shown, the total value of the financial instrument at maturity is calculated as if interest would be allowed to compound from a date when the early redemption request was received to maturity of the financial instrument (Block 402). For example, the total value of the financial instrument at maturity ("V") may be calculated from Equation 1, above.

The current market rate of interest for a replacement financial instrument that is comparable to the financial instrument is then determined wherein the replacement financial instrument has a term equal to or less than term remaining to maturity of the financial instrument (Block 404). The current value of the financial instrument is determined (Block 406). This amount is determined by calculating an amount of principal that can be invested at the current market rate of interest for the term to yield the total value (Block 408). For example, the amount of principal ("PR") that can be invested may be calculated from Equation 2, above.

The market value adjustment is determined (Block 410). As shown, the amount of principal is subtracted from the current value of the financial instrument to yield the market value adjustment (Block 412). The market value adjustment comprises a bonus portion such that the payout is greater than the current value of the financial instrument when the current market rate of interest is less than the annual percentage yield and/or a discount portion such that the payout is less than the current value when the current market rate of interest is greater than the annual percentage yield.

In implementations, the issuing financial institution may extract value via pricing differential from the additional value proposition arising from the potential of redemption prior to maturity exceeding the combined current principal and interest value of the financial instrument. In recognition of this additional value opportunity the financial institution can justify a lower interest rate for the financial instrument (e.g., fair market value certificate of deposit (CD) compared to a conventional certificate of deposit (CD) with a traditional penalty structure for early withdrawal. This pricing differential may directly lower the cost of funds for the issuing financial institution without compromising the volume or composite maturity of the funding portfolio. However, it is contemplated that, in one or more implementations, a processing fee may further be applied (added to the redemption fee or subtracted from the redemption bonus) (Block 414).

The current market value (payout) is then determined by adding current value of the financial instrument and the market value adjustment (Block 416). As shown in FIG. 3, the financial institution may pay the current market value (payout) of the financial instrument to the depositor (Block 318) upon redeeming the financial instrument. The financial institution may also issue a replacement financial instrument in an amount and for a term offered by the financial institution and chosen by the depositor at the current market rate of interest, or other interest rate offered by the financial institution.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method comprising:
    determining, by a processor, a current market rate of interest;
    comparing, by the processor, the current market rate of interest with an annual percentage yield of a financial instrument, the financial instrument issued from a financial institution; and
    receiving, by the processor, an early redemption request prior to a maturity date of the financial instrument, the early redemption request comprising a request for a payout equal to a current value of the financial instrument and a market value adjustment, the current value equal to a principal of the financial instrument plus an accrued interest,
    the market value adjustment comprising a bonus portion such that the payout is greater than the current value of the financial instrument when the current market rate of interest is less than the annual percentage yield and the market value adjustment comprising a discount portion such that the payout is less than the current value when the current market rate of interest is greater than the annual percentage yield;
    wherein the financial instrument is a certificate of deposit (CD).

2. The method as recited in claim 1, further comprising causing issuance of the payout to a depositor in response to receiving the early redemption request prior to the maturity date of the financial instrument.

3. The method as recited in claim 1, wherein the market value adjustment is determined by:
    calculating a total value of the financial instrument at maturity if interest is allowed to compound from a date when the early redemption request was received to maturity of the financial instrument;
    determining the current market rate of interest for a replacement financial instrument that is comparable to the financial instrument, the replacement financial instrument having a term equal to or less than the number of days remaining to maturity of the financial instrument;
    calculating an amount of principal that can be invested at the current market rate of interest for the term to yield the total value; and
    subtracting the amount of principal from the current value of the financial instrument to yield the market value adjustment.

4. The method as recited in claim 3, wherein determining of the market value adjustment further comprises applying a processing fee.

5. The method as recited in claim 1, further comprising providing a statement to a depositor of the financial instrument, the statement describing at least one of the payout, the current value of the financial instrument, the market value adjustment.

6. A method comprising:
    determining, by a processor, a current market rate of interest; comparing, by the processor, the current market rate of interest with an annual percentage yield of a time deposit financial instrument, the time deposit financial instrument issued from a financial institution; and
    presenting, by the processor, an early redemption request prior to a maturity date of the time deposit financial instrument, the early redemption request comprising a request for a payout equal to a current value of the time deposit financial instrument and a market value adjustment, the current value equal to a principal of the time deposit financial instrument plus an accrued interest;

causing, by the processor, issuance of the payout to a depositor in response to receiving an acceptance of the early redemption request prior to the maturity date of the time deposit financial instrument, the market value adjustment comprising a bonus portion such that the payout is greater than the current value of the time deposit financial instrument when the current market rate of interest is less than the annual percentage yield and the market value adjustment comprising a discount portion such that the payout is less than the current value when the current market rate of interest is greater than the annual percentage yield;

wherein the time deposit financial instrument is a certificate of deposit (CD).

7. The method as recited in claim 6, further comprising monitoring the market rates of interest.

8. The method as recited in claim 6, wherein the market value adjustment is determined by:

calculating a total value of the time deposit financial instrument at maturity if interest is allowed to compound from a date when the early redemption request was received to maturity of the time deposit financial instrument;

determining the current market rate of interest for a replacement time deposit financial instrument that is comparable to the time deposit financial instrument, the replacement time deposit financial instrument having a term equal to or less than the number of days remaining to maturity of the time deposit financial instrument;

calculating an amount of principal that can be invested at the current market rate of interest for the term to yield the total value; and subtracting the amount of principal from the current value of the time deposit financial instrument to yield the market value adjustment.

9. The method as recited in claim 8, wherein determining of the market value adjustment further comprises applying a processing fee.

10. The method as recited in claim 6, further comprising providing a statement to a depositor of the time deposit financial instrument, the statement describing at least one of the payout, the current value of the time deposit financial instrument, the market value adjustment.

11. A financial instrument management system comprising:

a memory operable to store one or more modules; and a processor operable to execute the one or more modules to: determine a payout for redemption of a time deposit financial instrument having a maturity date, the redemption occurring prior to the maturity date, the payout comprising a current value of the time deposit financial instrument and a market value adjustment, the current value of the time deposit financial instrument equal to a principal of the time deposit financial instrument plus an accrued interest, the market value adjustment comprising a bonus portion such that the payout is greater than the current value of the time deposit financial instrument when the current market rate of interest is less than the annual percentage yield and the market value adjustment comprising a discount portion such that the payout is less than the current value when the current market rate of interest is greater than the annual percentage yield;

wherein the time deposit financial instrument is a certificate of deposit (CD).

12. The financial instrument management system as recited in claim 11, wherein the processor is further operable to execute the one or modules to determine a current market rate of interest and compare the current market rate of interest with an annual percentage yield of the time deposit financial instrument.

13. The financial instrument management system as recited in claim 12, wherein the processor is further operable to execute the one or modules to monitor the current market rate of interest.

14. The financial instrument management system as recited in claim 11, wherein the processor is further operable to execute the one or modules to receive an early redemption request prior to the maturity date of the time deposit financial instrument, the early redemption request comprising a request for the payout.

15. The financial instrument management system as recited in claim 11, wherein the processor is further operable to execute the one or modules to present an early redemption request prior to the maturity date of the time deposit financial instrument, the early redemption request comprising a request for the payout.

16. The financial instrument management system as recited in claim 11, wherein the processor is further operable to execute the one or modules to determine the market value adjustment by:

calculating a total value of the time deposit financial instrument at maturity if interest is allowed to compound from a date when the early redemption request was received to maturity of the time deposit financial instrument;

determining the current market rate of interest for a replacement time deposit financial instrument that is comparable to the time deposit financial instrument, the replacement time deposit financial instrument having a term equal to or less than the number of days remaining to maturity of the time deposit financial instrument;

calculating an amount of principal that can be invested at the current market rate of interest for the term to yield the total value; and subtracting the amount of principal from the current value of the time deposit financial instrument to yield the market value adjustment.

17. The financial instrument management system as recited in claim 11, wherein the processor is further operable to execute the one or more modules to provide a statement to a depositor of the time deposit financial instrument, the statement describing at least one of the payout, the current value of the time deposit financial instrument, the market value adjustment.

* * * * *